May 8, 1934.  W. R. BOLTON  1,957,689
SOLE FITTING MACHINE
Filed Oct. 8, 1932
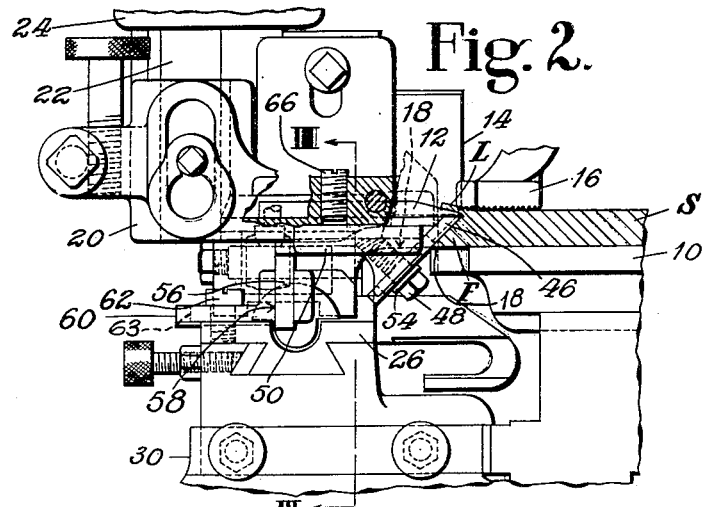
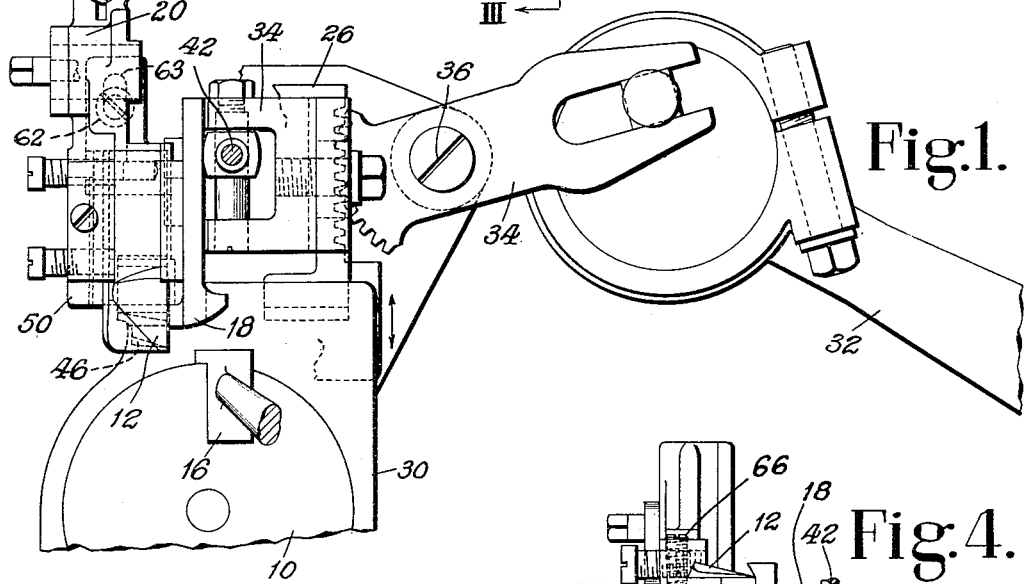
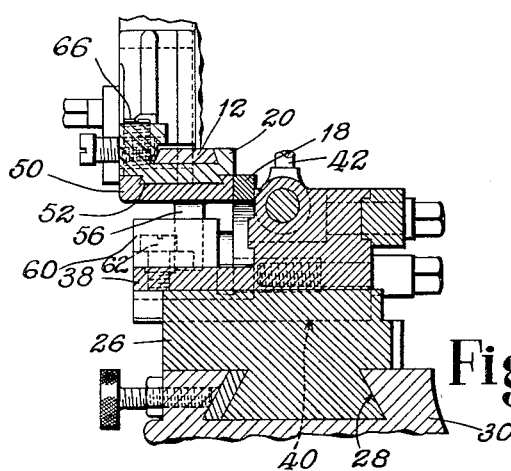
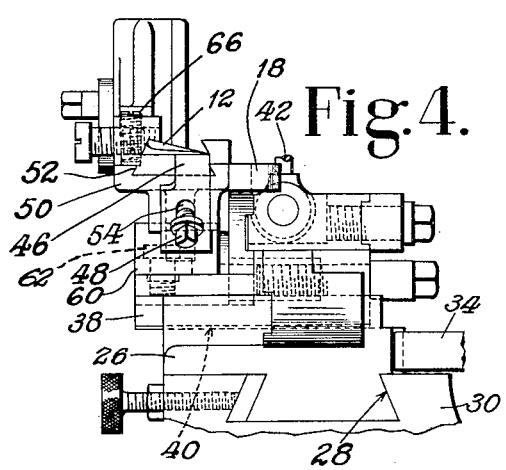
INVENTOR
William R. Bolton
By his Attorney
Harlow M. Davis Patented May 8, 1934

1,957,689

UNITED STATES PATENT OFFICE 1,957,689

SOLE FITTING MACHINE

William R. Bolton, Chicago, Ill., assignor to United Shoe Machinery Corporation, Paterson, N. J., a corporation of New Jersey Application October 8, 1932, Serial No. 636,860

16 Claims. (Cl. 12—27)

This invention relates to improvements in sole fitting machines and is herein illustrated as embodied in a machine adapted to form a marginal lip and a fastener on an insole and to bevel the feather at the side adjacent to the lip.

In United States Letters Patent No. 1,245,594, granted November 6, 1917, upon application of A. E. Johnson, there is disclosed a sole fitting machine adapted to operate upon an insole to form a marginal lip and a feather the edge of which is beveled at the side adjacent to the lip in the shank portion only of the insole in order to insure close fitting of the shoe at the instep. In the machine disclosed in the Letters Patent referred to the lip and feather forming means comprises a lip knife having two angularly disposed cutting edges, one of which is disposed in substantially parallel relation to the face of the sole to form the inner portion of the lip cut, and the other of which is disposed obliquely to the face of the sole to form the beveling cut, and during the operation of the machine an edge gage is manually adjusted in a direction transverse to the direction of work feed to shift the insole edgewise relatively to the lip knife in such a manner as to produce a relatively narrow feather with an unbeveled edge in the forepart of the insole and a relatively wide feather having a beveled edge in the shank portion of the insole.

In the manufacture of insoles for some types of welt shoes it is desirable to reduce the edge thickness of the feather at the side adjacent to the lip around the forepart as well as along the shank portion of the insole in order to prevent upward curling of the margin of the insole in the forepart of the shoe.

One object of the present invention is to provide an improved sole fitting machine which will form a marginal lip on an insole and which is capable of operating to form a feather which is relatively narrow in one portion of the insole and is relatively wide in another portion of the insole and to effect a substantially uniform reduction of the edge thickness of the feather, at the side adjacent to the lip, throughout the entire length of the feather.

With this object in view, one feature of the present invention consists in the provision, in a sole fitting machine, of lip and feather forming means and gaging means which are relatively adjustable to vary the width of the feather, and means for reducing the edge thickness of the feather at the side adjacent to the lip, said reducing means being adjustable in unison with the relative adjustment of the gaging means and the lip and feather forming means to insure uniformity in the width of the reduced portion of the feather despite variation in the full width of the feather resulting from said relative adjustment.

In the illustrated machine, the beveling knife is initially adjusted so that the bevel cut will intersect the lip cut and thus insure that a strip or chip will be completely severed from the insole by the beveling operation. The lip knife of the illustrated machine, moreover, is mounted for vertical yielding movement to accommodate variation in sole thickness and, in order to insure that the material cut from the feather by the reducing knife shall be completely severed from the insole irrespective of variation in sole thickness, the beveling knife, shown in the drawing, in accordance with another feature of the present invention, is mounted for vertical yielding movement in unison with the lip knife so that the lip cut and the bevel cut will intersect regardless of the thickness of the work.

In order that the illustrated machine shall be capable of operating when desired to form a relatively narrow lip and feather in one portion, for example at the forepart of an insole, and to form a relatively wide lip and feather in another portion, for example at the shank of the insole, and to reduce the edge thickness of the feather only in the relatively wide portion thereof, provision is made, as herein shown, whereby the reducing knife may be readily disconnected from the edge gage and rigidly connected to the lip knife in such relation to the latter that the reducing knife will operate upon the relatively wide portion of the feather but will not operate upon the relatively narrow portion thereof. The illustrated means for accomplishing this result comprises a clamping screw so arranged that by tightening the screw the lip knife and the reducing knife will be rigidly connected and, by loosening the clamp screw, the two knives will be disconnected for independent adjustment transversely of the direction of work feed.

The invention further consists in features of construction and combinations and arrangements of parts hereinafter described and claimed the advantages of which will be obvious to those skilled in the art.

The invention will be explained with reference to the accompanying drawing, in which Fig. 1 is a plan view of so much of a sole fitting machine as is necessary to illustrate the application of the present invention thereto;

Fig. 2 is a rear elevational view of a portion of the mechanism shown in Fig. 1, illustrating the operation of the machine upon an insole, portions of the mechanism being broken away for clearness of illustration;

Fig. 3 is a sectional view taken substantially along the line III—III of Fig. 2; and Fig. 4 is a side elevational view illustrating particularly the mounting of the lip knife and the reducing knife.

Referring to the drawing, the illustrated machine comprises a work-supporting table 10 which is capable of being lowered from operative work-supporting position to facilitate insertion and removal of the work; a vertically yieldable lip knife 12 for slitting the edge of a sole, such as the sole S shown in Fig. 1, to form a marginal lip L and a feather F in the sole; a presser gage 14 (Fig. 2) which gages the thickness of the lip formed by the lip knife 12 and which also functions to impart a step-by-step feed movement to the work; a work-retaining foot 16 for holding the work stationary between successive step movements thereof; and an edge gage 18 for determining the extent of penetration of the lip knife and consequently the width of the lip and the feather. The lip knife 12 is fixed to a knife block 20 which is secured to a vertically yieldable slide 22 to which the presser gage 14 is also secured. The slide 22 is mounted in a carrier 24 which is oscillated to move the lip knife 12 and the presser gage 14 back and forth in the line of work feed. The sole S is fed across the table 10 by the forward movements of the presser gage 14 and the lip knife 12 while the work retaining foot 16 is raised from the work and, after completion of each feeding movement the work retaining foot 16 descends to clamp the sole S against the table 10 and thus to hold the sole from movement while the lip cut is made on the backward stroke of the lip knife 12. The edge gage 18 is mounted on a slide 26 which is dovetailed for horizontal sliding movement in a groove 28 (Fig. 3) in the frame 30 and which is adapted to be adjusted in and out, or transversely of the direction of work feed, by means of a handle 32 (Fig. 1) suitably connected to a lever 34 pivoted at 36 to the frame of the machine and, in turn, operatively connected to the edge gage slide 26, this adjustment of the edge gage slide 26 being for the purpose of adjusting the edge gage to shift the sole edgewise relatively to the lip knife while the sole is being fed and operated upon to vary the depth of cut made by the lip knife and thus to vary the width of the lip and the feather at different parts of the sole margin. The edge gage 18 is directly secured to an auxiliary slide 38 which is mounted in ways 40 in the in-and-out slide 26 and which is connected, by means including a vertical pin 42, with the lip knife carrier 24 for movement back-and-forth in the line of work feed in unison with the lip knife so that a constant relation will be maintained between the knife and the point of engagement of the edge gage with the sole. The above-described construction and arrangement of parts and the mode of operation thereof is substantially the same as that of corresponding parts disclosed in United States Letters Patent No. 1,023,801, granted April 23, 1912, upon application of F. E. Bertrand and reference may be had to said Letters Patent for details of construction not herein fully disclosed.

The means for reducing the thickness of the feather F at the side adjacent to the lip L comprises a beveling knife 46 which is carried by the lip knife block 20 and which, as shown, is located beneath the lip knife and is disposed at an angle of substantially 45° to the surface of the work table 10. In order that the beveling knife 46 shall operate to cut a bevel of substantially uniform width, irrespective of variations in the width of the feather in different portions of the insole, the beveling knife is mounted in the lip knife block 20 for horizontal sliding adjustment transversely of the direction of work feed, and is connected for adjustment in unison with the edge gage 18. To this end the beveling knife 46 is fixedly but adjustably secured by means of a screw 48 to a slide 50 which is connected by a dovetailed connection 52 (Fig. 3) to the lower side of the lip knife block 20. The screw 48 extends through a slot 54 (Fig. 4) in the beveling knife which is arranged to permit adjustment of the beveling knife to insure that the cut made by that knife will intersect the cut made by the lip knife 12. To insure in-and-out adjustment of the beveling knife in unison with the in-and-out adjustment of the edge gage the beveling knife is connected with the edge gage by means comprising a tongue 56 which extends downwardly from the beveling knife slide 50 and is received in a notch 58 formed in a block 60 which is detachably secured to the edge gage slide 26 by means comprising a screw 62. As best shown in Fig. 1, the screw 62 extends through a slot 63 arranged to permit adjustment of the beveling knife relatively to the edge gage transversely of the direction of work feed to enable the knife 46 to cut beveled faces of different widths and to reduce to different extents the thickness of the feather.

The above-described construction and arrangement of parts is such that when the edge gage is adjusted to vary the width of the lip and the feather of an insole, a corresponding adjustment will be imparted to the beveling knife 46 through the medium of the tongue-and-notch connection 56—58 between the beveling knife slide 50 and the block 60 on the edge gage slide 26, the beveling knife moving during such adjustment in the ways 52 on the lip knife block 20. By thus connecting the beveling knife for adjustment transversely of the direction of work feed in unison with the adjustment of the edge gage, a substantially uniform width of bevel upon the feather is insured regardless of variations in the width of the feather in different parts of the insole. This construction further insures that the edge contour of the feather will remain unchanged regardless of such variation as may occur in the width of the feather as a result of adjustment of the edge gage.

It is, of course, desirable that the chip which is trimmed from the feather by the beveling knife 46 shall be completely severed from the body of the insole irrespective of any variation in the thickness of the insole at different portions of its margin. In order to insure complete severance of the chip cut by the beveling knife from the insole, the construction of the illustrated machine is further such that as the lip knife 12 rises or falls in response to variation in sole thickness the beveling knife 46 will rise or fall a corresponding amount due to the dovetailed connection between the beveling knife slide 50 and the lip knife block 20, the tongue 56 on the beveling knife slide moving vertically at such time within the notch 58 in the block 60. This insures that the beveling knife will be maintained at all times in its initially adjusted relation to the lip knife 12 wherein the cut made by the beveling knife will intersect the cut made by the lip knife.

It may sometimes be desirable to cut a relatively wide lip and feather, to bevel the edge of the feather along opposite sides of the shank portion of an insole, and to cut a relatively narrow lip and feather without beveling the edge of the feather around the forepart of the insole. In order to adapt the present machine to operate in that manner upon an insole, a screw 66 is threaded through the lip knife block 20 in such a location, as best shown in Fig. 2, that by tightening the screw, the screw will engage the beveling knife slide 50 to clamp the latter rigidly to the lip knife block 20, thus preventing relative movement between those parts. When the lip knife block and the beveling knife slide are thus clamped rigidly together, the notched block 60 may be detached from the machine by removal of the screw 62, thereby disconnecting the beveling knife slide 50 from the edge gage. For this class of work the lip knife will be adjusted so as to project beyond the beveling knife somewhat more than shown in the drawing so that when the edge gage is adjusted to position a sole for the cutting of a wide lip and feather the beveling knife will be positioned to bevel the edge of the feather but when the edge gage is adjusted to position a sole for the cutting of a relatively narrow lip and feather the beveling knife will be located in a position clear of the sole and no beveling of the feather will be effected. By merely loosening the screw 66, without entirely removing it from the lip knife block 20, the lip knife block may be disconnected from the beveling knife slide, leaving those parts free for relative adjustment to adapt the machine for operations in cases where, as heretofore described, it is desirable to bevel the edge of the feather not only where the feather is made relatively wide but also where it is made relatively narrow, or, in other words, where it is desirable to bevel the feather throughout its entire length regardless of whether it is cut relatively wide or relatively narrow.

Having thus described my invention what I claim as new and desire to secure by Letters Patent of the United States is:

1. In a sole fitting machine, means for forming a marginal lip and a feather in a sole, gaging means for determining the width of the feather, means for reducing the edge thickness of the feather at the side adjacent to the lip, said gaging and said reducing means being relatively adjustable in a direction transverse to the edge of the sole to adapt the machine to form reduced areas of different widths, and means for adjusting said gaging means and said reducing means in unison to vary the width of the feather without varying the width of the reduced area while the machine is operating upon a sole.

2. In a sole fitting machine, means for forming a marginal lip and a feather in a sole, sole edge gaging means, said lip and feather forming means and said gaging means being relatively adjustable to vary the width of the feather, and means adjustable in unison with said relative adjustment for reducing the edge thickness of the feather at the side adjacent to the lip.

3. In a sole fitting machine, means for forming a lip and a feather in a sole, means for supporting a sole and feeding it to said lip and feather forming means, and means for guiding a sole as it is being fed and for reducing the edge thickness of the feather at the side adjacent to the lip, said lip and feather forming means and said guiding and reducing means being relatively movable in a direction transverse to the direction of work feed to vary the width of the feather.

4. In a sole fitting machine, a lip and feather forming knife, means for supporting a sole and feeding it to said knife, and means adjustable transversely of the direction of work feed for shifting the sole edgewise relatively to said knife to vary the width of the feather and for reducing the edge thickness of the feather at the side adjacent to the lip.

5. In a sole fitting machine, means for forming a marginal lip and a feather in a sole, a gage adjustable transversely relatively to the edge of the sole to vary the width of the feather, and means adjustable in unison with the edge gage for reducing the edge thickness of the feather at the side adjacent to the lip.

6. In a sole fitting machine, in combination, a knife for forming a marginal lip and a feather in a sole, means for supporting the sole and feeding it past said knife, an edge gage mounted for adjustment transversely of the direction of work feed, a knife mounted for adjustment transversely of the direction of work feed for beveling the edge of the feather at the side adjacent to the lip, and connections between the beveling knife and the edge gage for causing the beveling knife to move in unison with the edge gage.

7. In a sole fitting machine, in combination, a yieldable knife for forming a feather in a sole, a presser gage mounted in fixed relation to said knife for determining the thickness of the feather, means for supporting a sole and feeding it past said knife, a sole edge gage adjustable transversely of the direction of work feed, and a knife for beveling the edge of the feather, said beveling knife being adjustable in unison with the edge gage and yieldable in unison with the lip knife and presser gage.

8. In a sole fitting machine, in combination, a yieldable knife for forming a marginal lip and a feather in a sole, means for supporting the sole and feeding it past said knife, an edge gage mounted for adjustment transversely of the direction of work feed, a knife for beveling the edge of the feather at the side adjacent to the lip, connections between the beveling knife and the edge gage for moving said knife in unison with the edge gage, and connections between the beveling knife and the lip knife for causing the beveling knife to yield in unison with the lip knife.

9. In a sole fitting machine, in combination, a yieldable knife for forming a lip and a feather in a sole, means for supporting the sole and feeding it past said knife, an edge gage, means for adjusting the edge gage transversely with respect to the direction of work feed, a knife for beveling the feather at the side adjacent to the lip, said beveling knife being movable transversely with respect to the direction of work feed and constrained to yield in unison with the lip knife, and connections between the beveling knife and the edge gage for adjusting the beveling knife in unison with the edge gage.

10. In a sole fitting machine, in combination, means for supporting and feeding a sole, a lip knife movable back and forth in the line of work feed for forming a marginal lip and a feather in a sole, said knife being yieldable in the direction of the thickness of the lip, an edge gage movable in the line of work feed in unison with the lip knife and capable of adjustment transversely of the line of work feed to vary the width of the lip and the feather, a knife mounted for yielding movement in unison with the lip knife for beveling the feather, and connections between the beveling knife and the edge gage for adjusting the beveling knife transversely in unison with the edge gage.

11. In a sole fitting machine wherein a knife and a sole are relatively movable in a direction to form a feather in a sole, and in a second direction to vary the width of the feather, and in a third direction in accordance with variation in the thickness of the sole, a knife for reducing the edge thickness of the feather, and means for insuring relative movement between the reducing knife and the sole in said second and third directions in unison with the relative movement between the feather forming knife and the sole in said second and third directions, respectively.

12. In a sole fitting machine, in combination, a knife for forming a marginal lip and a feather in a sole, means for supporting a sole and feeding it to said knife, a sole edge gage adjustable relatively to said knife to vary the width of the feather, means for reducing the edge thickness of the feather at the side adjacent to the lip, said means being adjustable transversely of the direction of work feed, means including a detachable member for connecting said reducing means and said edge gage for adjustment in unison, and means operable upon removal of said member for connecting said reducing means for adjustment in unison with said lip and feather forming knife.

13. In a sole fitting machine, in combination, means for supporting and feeding a sole, a knife holder mounted for yielding movement in a direction perpendicular to the face of the sole and for adjustment in a direction transverse to the direction of sole feed, a knife mounted in said holder for forming a lip and a feather in the sole, a sole edge gage, means for adjusting the edge gage to vary the width of the feather, a knife for beveling the feather at the side adjacent to the lip, a holder for said beveling knife connected for yielding movement in unison with said lip and feather forming knife, means including a detachable member for connecting said beveling knife for adjustment in unison with said edge gage, and means operable upon removal of said member for fixedly securing the beveling knife holder to the lip and feather forming knife holder.

14. In a sole fitting machine, in combination, a vertically yieldable knife carrier, a knife mounted in said carrier for forming a lip and a feather in said sole, means for supporting the sole and feeding it to said knife, a knife for beveling the feather at the side adjacent to the lip, a carrier for said knife mounted on said lip knife holder and slidable relatively to said holder in a direction transverse to the direction of work feed, a sole edge gage, means for adjusting said gage in a direction transverse to the direction of work feed to vary the width of the feather, and means connecting the reducing knife carrier for adjustment in unison with the edge gage, said means being constructed and arranged to permit vertical yielding movement of said knives relatively to said gage.

15. In a sole fitting machine, in combination, a knife for forming a lip and a feather in a sole, a carrier for said knife, a knife for beveling the edge of the feather at the side adjacent to the lip, a carrier for the beveling knife slidably mounted on the lip knife carrier for adjustment relatively to the lip knife, and means for clamping the lip knife carrier to the beveling knife carrier.

16. In a sole fitting machine, in combination, means for supporting and feeding a sole, an edge gage adjustable transversely to the direction of work feed, a knife carrier mounted for vertical yielding movement relatively to the edge gage, a knife on said carrier for forming a lip and a feather in said sole, a knife for beveling the feather of the sole at the side adjacent to the lip, a carrier for the beveling knife mounted on the lip knife holder, said beveling knife carrier being yieldable vertically in unison with the lip knife holder and being adjustable relatively to the lip knife holder transversely of the direction of work feed, and a connection between the beveling knife carrier and the edge gage constructed and arranged to permit relative vertical movements of said parts and to insure adjustment of said parts in unison transversely of the direction of work feed.

WILLIAM R. BOLTON.

CERTIFICATE OF CORRECTION.

Patent No. 1,957,689.                                                                                                  May 8, 1934.

WILLIAM R. BOLTON.

It is hereby certified that error appears in the printed specification of the above numbered patent requiring correction as follows: Page 1, line 4, for "fastener" read feather; and that the said Letters Patent should be read with this correction therein that the same may conform to the record of the case in the Patent Office.

Signed and sealed this 7th day of August, A. D. 1934.

Leslie Frazer (Seal)                                                                                                    Acting Commissioner of Patents.